Jan. 3, 1967     T. D. SHARPLES     3,295,375
PROCESS AND APPARATUS FOR MEASURING MASS
DISTRIBUTION IN A ROTATING BODY
Filed Aug. 28, 1964     4 Sheets-Sheet 1
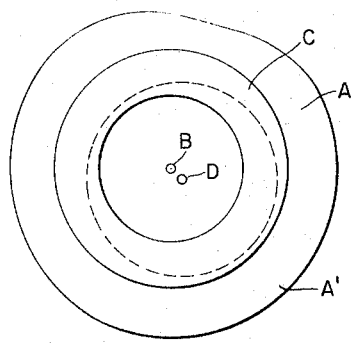
Fig.1
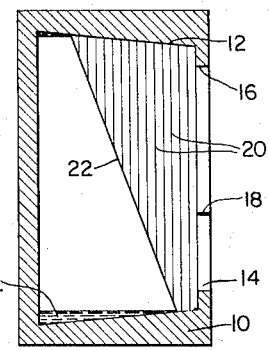
Fig.2
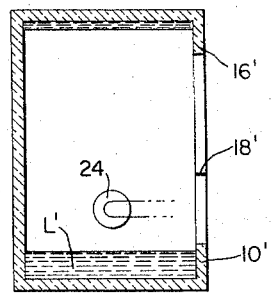
Fig.3
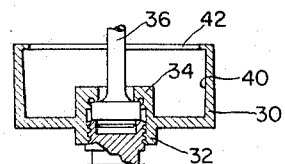
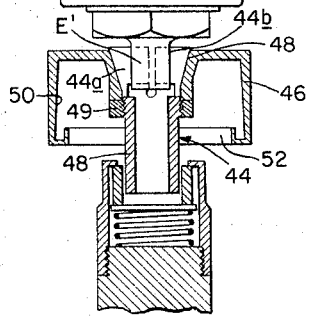
Fig.4
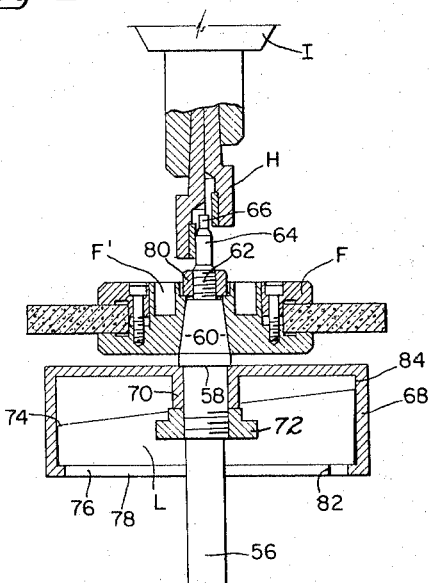
Fig.5
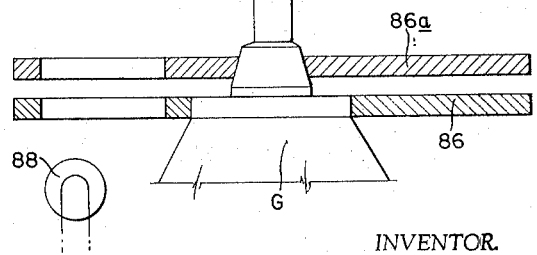
INVENTOR.
THOMAS D. SHARPLES
BY Dallett Hoopes
ATTORNEY Jan. 3, 1967 T. D. SHARPLES 3,295,375
PROCESS AND APPARATUS FOR MEASURING MASS
DISTRIBUTION IN A ROTATING BODY
Filed Aug. 28, 1964 4 Sheets-Sheet 2

INVENTOR.
THOMAS D. SHARPLES
BY Dallett Hoopes
ATTORNEY

Jan. 3, 1967     T. D. SHARPLES     3,295,375
PROCESS AND APPARATUS FOR MEASURING MASS
DISTRIBUTION IN A ROTATING BODY
Filed Aug. 28, 1964     4 Sheets-Sheet 3

INVENTOR.
THOMAS D. SHARPLES
BY
ATTORNEY

Jan. 3, 1967 T. D. SHARPLES 3,295,375
PROCESS AND APPARATUS FOR MEASURING MASS
DISTRIBUTION IN A ROTATING BODY
Filed Aug. 28, 1964 4 Sheets-Sheet 4
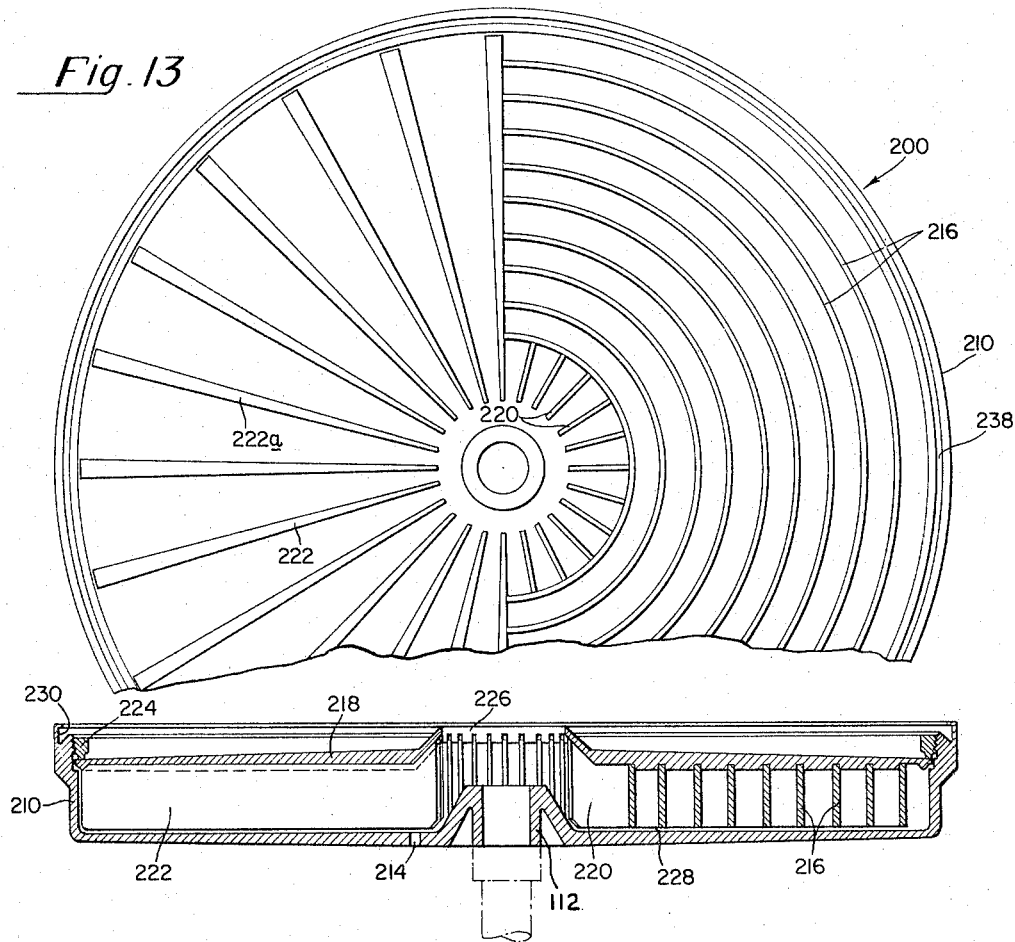
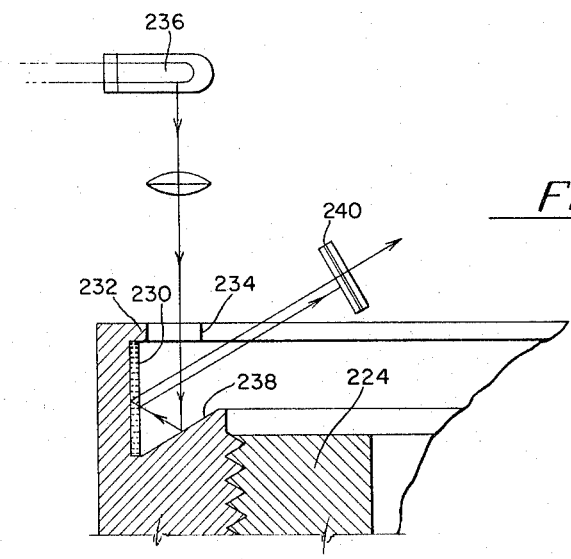
INVENTOR.
THOMAS D. SHARPLES
BY Dallett Hooper
ATTORNEY United States Patent Office 3,295,375
Patented Jan. 3, 1967

3,295,375
PROCESS AND APPARATUS FOR MEASURING MASS DISTRIBUTION IN A ROTATING BODY
Thomas D. Sharples, Lansdale, Pa., assignor to Pennsalt Chemicals Corporation, Philadelphia, Pa., a corporation of Pennsylvania
Filed Aug. 28, 1964, Ser. No. 392,896
5 Claims. (Cl. 73—466)

This invention relates to the measurement of the mass distribution in a rotating body, or, in other words, the detection and measurement of unbalance in a rotating body.

More specifically this invention relates to the determination of mass distribution of rotating bodies with respect to the "mechanical axis" of the body. "Mechanical axis" herein refers to the axis of the bearing on which the body rotates or, in cases in which the concern is not with the vibration of the bearing, the "mechanical axis" may be arbitrarily selected as the axis of any surface of revolution on the body for a particular application.

The invention may be used to determine rotor mass distribution for the purpose of altering mass distribution to achieve vibration-free bearing characteristics or "balanced" rotor operation. It can also be used to observe and measure a progressive change in mass distribution of a rotor in order to follow the course of solids sedimenting in a liquid. It has numerous other uses.

In the past, machines for measuring unbalance have approached the problem in a number of different ways. All of these, however, may be divided into three general categories which are (a) sub-critical machines which operate at speeds less than half the resonance speed of the rotor bearing system; (b) critical machines which operate at resonance for the purpose of mechanical amplification, and (c) super-critical machines which usually operate at a speed 40% or more above resonance. Machines of type (a) are designed to measure the force at the bearings. Machines of type (b) are designed with a means for applying an adjustable counter force which acts to null the vibrations. Machines of type (c) measure the amplitude of vibration. Type (c) may be further subdivided into machines in which flexibility is introduced between the bearings and the bearing support in which case the amplitude is measured between a ground reference and the vibratory bearing or, alternatively, the flexibility may be introduced between the bearing and the rotor, in which case the amplitude is measured between arbitrarily selected rotor surfaces of revolution and the ground.

The type (c) balancing machines have many advantages over the other types because the rotor is turning on its axis of inertia, or free axis, and the vibration amplitude does not depend on speed but only on the eccentricity of this axis from the mechanical axis. But the eccentricity heretofore has been measured from a ground or fixed reference point and has been subject to large errors.

The present invention presents a measuring technique, applicable to rotor systems of the super-critical type, which eliminates the grounded reference and simply measures the eccentricity between the free axis of inertia and the mechanical axis directly.

The present invention is predicated on the fact that the free-surface of the liquid in a rotor running above its critical speed has as its axis of symmetry very nearly the free axis of rotation of the rotor, provided the liquid mass is small in proportion to the rotor mass. In accordance with the present invention ways are provided to determine the relationship between such a free surface and a surface coaxial with the mechanical axis of the rotor.

The invention will be better understood by reference to FIGURE 1 of the attached drawings. In FIGURE 1, A represents the unbalanced body having a mechanical axis B. Mounted on or integral with the body A is a cup having the inwardly facing annular pocket C, the inner surface of the peripheral wall having as its axis the mechanical axis B of the body.

In accordance with the present technique the body A to be measured and the cup having pocket C are arranged to be rotated so that the body is turning on its free axis of inertia D. This may be done by mounting it on a thin, relatively flexible rotating spindle or on a relatively rigid spindle running in flexibly mounted bearings. Also, by suitable arrangement it may be suspended on a suitable fluid bearing, or on a magnetic or electromagnetic bearing and driven by various means, such as by air jet or electromagnetic rotating field.

The extent that the selected system of rotor support constrains the rotor to rotate on its mechanical axis establishes a spring constant. This rate taken with the mass of the rotor, and neglecting minor gyroscopic effects, determines a resonance speed or critical speed. Below the critical speed the rotor will tend to rotate with the heavy side A' at the maximum runout radius and as the speed increases this deflection will become larger as the increased centrifugal force overcomes the spring force of the suspension system. At the critical speed the centrifugal force exactly equals and cancels the spring force and unless the rotor is externally constrained by a suitable means or unless it is driven very rapidly through and above this critical speed it can move off in an uncontrolled fashion and be destroyed. However, above critical speed the rotor inertia force is in excess of the spring force and the rotor tends to spin on its free axis. Above critical speed the heavy side of the rotor occupies a position which approaches 180° displacement from the angular position it occupied below the critical speed.

In accordance with the present invention a liquid is disposed in the pocket C in small amount relative to the rotor mass. The liquid in the pocket assumes a circular disposition (dotted lines). As the object spins about its free spin axis above the critical speed the free liquid surface is a measure of the location of the free spin axis. It follows that the depth of the liquid pool measured at various stations about the pocket provides a direct measure of the eccentricity of the mechanical axis, as defined by the cup wall, from the free axis. It is, in fact, only necessary to read the difference between maximum and minimum depths to get the eccentricity while the angular location of maximum or minimum shows the angular location of imbalance. Even more simply, from a single reading of the maximum or minimum depth and its angular position and given the amount of liquid present in the pocket, the amount and position of unbalance can be derived.

It is, therefore, an object of the invention to permit accurate measurement of the distribution of mass in a rotating body while the body is rotating and in a simple convenient manner without the need for means to relate the free axis of the body to a reference ground.

Other features of the invention will become apparent from further reference to the attached drawings showing various embodiments of the invention and wherein:

FIGURE 1 schematically shows an axial view illustrating the concept of the invention;

FIGURE 2 is a sectional view through an element of an apparatus embodying the invention;

FIGURE 3 is a sectional view of a modified form of element from an apparatus embodying the invention;

FIGURE 4 is a broken elevational view of the invention as used with a centrifuge bowl;

FIGURE 5 is a broken top view, partly in section, and illustrating an embodiment of the invention;

Figure 9:
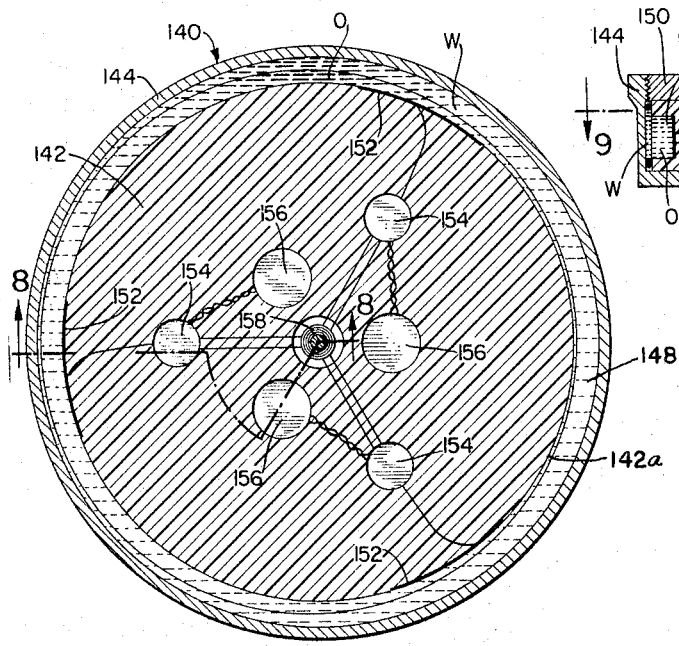
Figure 8:
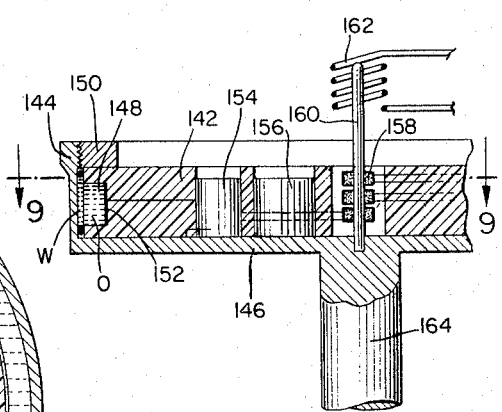
Figure 12:
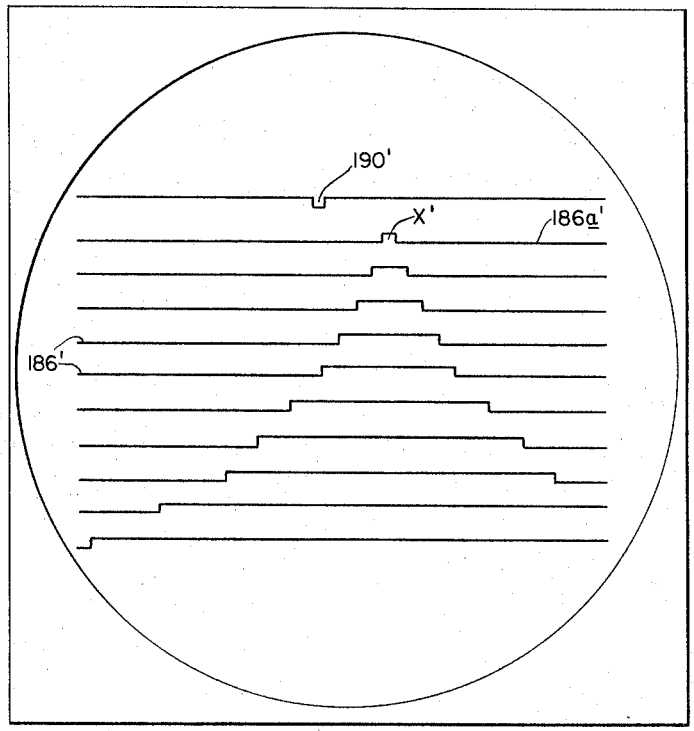
Figure 11:
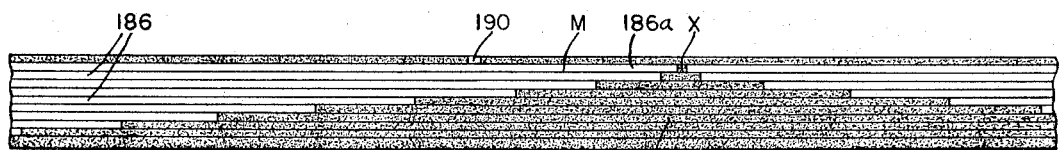
Figure 10:
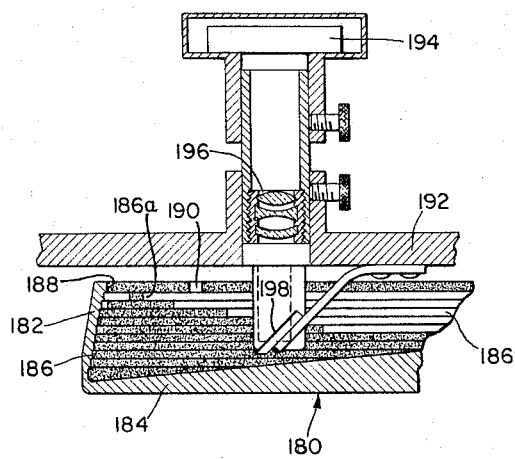

FIGURES 8 and 9 are a broken sectional elevation taken on line 8—8 of FIGURE 9, and a top sectional view taken on line 9—9 of FIGURE 8, respectively, of another modified form of apparatus embodying the invention;

FIGURE 10 is a broken fragmentary partly sectional elevation of a modified form of apparatus embodying the invention;

FIGURE 11 is a panaramic view from inside the pocket of the apparatus disclosed in FIGURE 10;

FIGURE 12 is an oscilloscope representation of indicia from an apparatus such as disclosed in FIGURE 10;

FIGURE 13 is a fragmentary plan view of an apparatus with cover removed for determining particle size distribution with the help of the present invention;

FIGURE 14 is a centerline sectional view of the rotor of FIGURE 13 showing how the invention is applied; and FIGURE 15 is an enlarged fragmentary view of the section of the rotor of FIGURE 14 pertinent to the invention.

Referring more specifically to the drawings, FIGURE 2 shows a pocket or cup 10 by which the invention may be practiced. The inner surface 12 of the peripheral wall is tapered, in the embodiment shown narrowing toward the mouth 14 of the pocket. The mouth is provided with a lip 16 bearing an index stroke 18 for determining relative rotary position. Peripheral index lines 20 are uniformly spaced on the surface 12. In use the cup contains a liquid, preferably opaque, of sufficient quantity so that in balanced condition the level of the liquid in rotation meets the surface 12 about half way up the surface.

As shown in FIGURE 2 when the mechanical axis of the cup or pocket 10 and its free-spin axis do not coincide, the meeting line 22 of the liquid surface cuts across several of the peripheral index lines 20 rising to a more rightward line (FIGURE 2) on one side of the pocket than on the other. In the embodiment illustrated, therefore, it will be readily seen that the depth of liquid in the lower portion of the figure is greater than in the higher portion, and assuming that the rotation is above the critical speed for the system the unbalance is heavy toward the upper portion of the figure.

Basis for the derivation of correction of the unbalance may be taken by reading the position of line 22 with respect to the lines 20 at various stations about the cup by a stroboscopic light source which will, of course, indicate a stable position for index 18.

It will be understood, of course, that the more gradual the taper of the surface 12 the more sensitive the present technique may be. For instance, if the taper is say .001 inch over a distance of 1" then upon a shift in axis of only .00025" the deflection of the intersection of the liquid with the wall surface will shift from a circular line about the center of the taper to an oblique attitude in which it touches the extremities of the one-inch taper on opposite sides of the cup. If the taper is .002 inch over a one-inch long surface, the same shift in axis position will cause a change in position of the intersection of the liquid with the surface to an altitude in which it touches only the one-quarter and three-quarter index lines on the tapered surface. In addition, by changing the degree of taper on the surface in progressing from one end to the other greater sensitivity can be achieved in some zones than in others. For instance the center zone of the taper may be very gradual and the extreme zones steeper, giving greater sensitivity of the indicator as the mass approaches balance.

In the embodiment shown in FIGURE 3 the pocket or cup 10' is of transparent material and a light source 24 is disposed therewithin. The liquid L' is selected to have substantial light absorption characteristics, the transmitted light is modulated in intensity by thickness variations of liquid between the light and the detector. The detector 26 may be a photoelectric cell of sufficient sensitivity to measure the difference in light transmitted through the liquid L' as it varies in thickness during rotation of the cup. For instance, the detector 26 should be able to measure the increased intensity of light transmitted as the pocket or cup 10' rotates from the position shown through 180° at which point a much thinner layer of liquid will be disposed between it and the light source 24. The indicia 18' on the lip 16' may be sensed by the same or another photoelectric cell. The response from the cell or cells may be displayed on the oscilloscope wherefrom appropriate measurements can be taken and calculations made.

Alternatively, the liquid in the FIGURE 3 embodiment may be opaque but in extremely small quantity such that a slight unbalance will cause a complete interception of light on the side of the unbalance.

Combinations of the FIGURE 2 and FIGURE 3 are possible. For instance, the cup may be tapered as in the FIGURE 2 embodiment and transparent as in the FIGURE 3 embodiment, the photosensitive device reading the light condition at a given point on the taper.

FIGURE 4 illustrates how the invention may be applied to the unbalance detecting of a tubular centrifuge bowl E. As shown the conventional spindle nut is replaced by the cup 30 having an enlarged central boss 32 internally threaded and provided with a shoulder 34. The cup is used as shown to secure the drive spindle 36 to the centrifuge hub 38. The inner surface 40 of the peripheral wall of the cup is tapered, widening as the mouth 42 is approached and indicia (not shown) similar to those in FIGURE 2 are provided.

As shown at the lower end of the bowl E the bowl presents boss E'. A boss extension 44 in the nature of a collet has a longitudinally split, externally tapered head 44a with a mouth 44b and an externally threaded portion adjacent the head. The mouth 44b receives the extension E'. A second cup 46 has a central tapered bore 48 and a nut 49 draws the collet head into the bore so that it firmly engages the bowl boss. The inner surface of the peripheral wall of the cup 46 is tapered, widening as the mouth 52 of the cup is approached. The mouth 52 is provided with an upturned annular lip to prevent escape of liquid when the machine is at rest. The cup 46 is provided with index lines (not shown).

In operation the drive spindle 36 rotates the assembly. After the system has reached and passed its critical speed the levels to which the liquid in the cups 30 and 34 reaches at various stations in the cups, respectively, are measured. From this information balance corrections may be made on the opposite ends of the bowl, respectively, to cause substantial coincidence of the mechanical axis and the free-spin axis of each end.

FIGURE 5 is a top view disclosing the use of the invention in balancing a work piece F which may be a grinding wheel as shown. The simplicity of the operation is demonstrated on a standard piece of shop equipment, namely a wood or metal turning lathe. The headstock of the lathe is represented by G. It opposes the dead center H of the tailstock I. Chucked into the headstock is the shaft 56 which is enlarged adjacent its distal end to provide a shoulder 58 and a tapered portion 60 having a reduced threaded portion 62. From the threaded portion 62 the shaft is further reduced to present a portion 64 stepped down to an even lesser radius at the tip 66.

The unbalance detector cup 68 which itself is of course balanced with respect to the shaft 56 has an enlarged boss 70 with a central opening receiving the shaft. The cup is held against the shoulder 58 by a nut 72 received onto a threaded portion of the shaft as shown. The inner surface 74 of the cup 68 is tapered, widening toward the mouth 76. The lip 78 retains the liquid L when the device is at rest. It should be understood that the perpendicular lip 78 retains the liquid since lathes as illustrated normally have a horizontal axis. In vertical embodiments an upturned lip, such as at 52 in FIGURE 4, would, of course, be desirable.

In operation the work piece F is mounted on the tapered portion 60 and held there by a nut 80. The work piece F is formed with an annular pocket F' for standard balancing weights. The dead center H in its leftward position (FIGURE 5) closely circumposes the reduced portion 64 of the shaft 56 until the shaft reaches a speed exceeding critical speed. The dead center is withdrawn to the position shown at the right-hand half of the representation of FIGURE 5 so that some clearance is available between the opening in the dead center and the reduced tip 66. The free-spin axis of the system will be derivable by reading the level of the liquid L at various stations about the cup 68. This may be accomplished with the aid of a stroboscopic light as in earlier embodiments, noting the position of the index 82 and the peripheral index lines 84 at the maximum and minimum of the intersection of the liquid and the surface. While a stroboscopic light unit is usable, the headstock 50 may mount a fixed slotted plate 86 and the live center may present a rotating slotted plate 86a through which an ordinary incandescent light 88 may shine into the cup 68 to the same effect.

Figure 6:
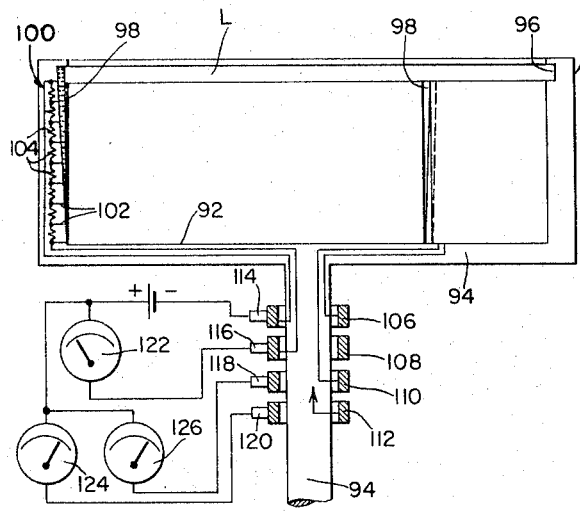
FIGURES 6 and 7 are respectively a sectional partly schematic elevation and top plan view with portions broken away of a modified form of apparatus embodying the invention. For simplicity section lines have been left out of FIGURE 6.
Figure 7:
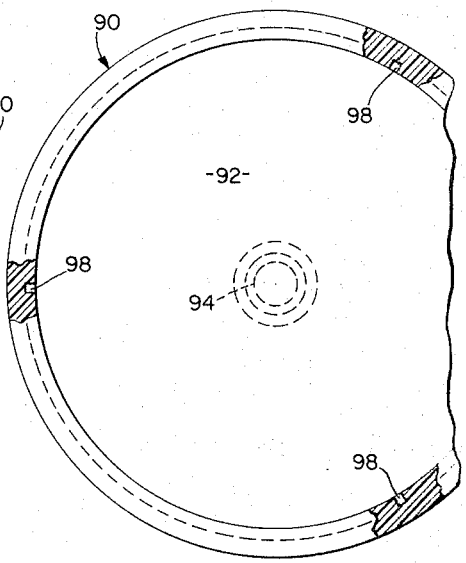

FIGURES 6 and 7 disclose an alternate means for detecting the disposition of a liquid in the tapered-cup type detector disclosed in FIGURE 2. In the FIGURE 6 embodiment the cup 90 comprising a peripheral wall and the end wall 92 is mounted on a shaft 94. The inside surface of the peripheral wall is cylindrical and has the annular pocket 96. The slots 98 connect with the pocket and slope inward toward the end wall 92. Disposed in the peripheral wall which is preferably of electrically insulating material are sensing means designated broadly 100, and comprising spaced contacts 102 which have their ends exposed to the inside of the slots 98. Bridging adjacent contacts are resistance elements 104 (shown schematically). The uppermost of the contacts 102 (FIGURE 6) is connected by insulated electrical means to a slip ring 106 while the lowermost contact 102 (FIGURE 6) is connected by electrical means to a second slip ring 108.

As shown in FIGURE 7 the slots 98 (with sensing means 100) are disposed every 120° about the cup. Illustratively the upper contact of each of the three sensing means is connected to the slip ring 106 while the lower contacts of the three sensing means are respectively connected to slip rings 108, 110 and 112. Suitable brushes 114, 116, 118 and 120 cooperate with the slip rings, respectively, as shown. The brush 114 is connected through a source of current as shown to a terminal of each of the ammeters 122, 124 and 126, while the other terminals of the respective ammeters are connected to brushes 116, 118 and 120, respectively.

Thus in operation the cup 90 rotates above critical speed with the body or object being measured. The liquid therein, which is an electrically conductive liquid L, such as mercury, assumes a position in the cup such as shown in FIGURE 6. Depending on the position and extent of unbalance, the level of the liquid will rise to higher levels and engage contacts higher in some of the slots 98 than in others, and because resistance is disposed between each contact the readings on the ammeters will reflect these levels.

Thus the readings of the three ammeters 122, 124 and 126 will be related to the extent and position of unbalance of the body rotating with the cup of the FIGURES 6 and 7 embodiments, and the unbalance can be derived therefrom.

FIGURES 8 and 9 are views of further modified means of sensing position of liquid in a cup operated in accordance with the invention. In the FIGURE 9 view, instead of an open cup as shown in FIGURE 3, the cup 140 is provided with a filler 142 of insulating material and having a peripheral recess with an annular wall 142a spaced inward from the peripheral wall 144 and similarly secured to the end wall 146. This forms an annular space 148 between the peripheral wall 144 and the inner wall 142. The filler, appropriately sealed to wall 144 may be locked in place by a threaded ring 150 (FIGURE 8). Spaced uniformly about the surface of the wall 142a are a plurality of metal plates 152 (three spaced at 120° illustratively) which conform in shape to the surface of the wall 142a on which they are mounted. The cup 144 is of conductive material. Oscillators 154 powered by the cells 156 are mounted in the cup. The oscillators 154 are grounded to the cup 140 and respectively connected to the plates 152 so that they are respectively tuned by the capacitance between the two.

The output signal from the respective oscillators are transmitted to coils 158, each of which circumposes a ferrite rod 160 disposed centrally of the cup. As shown the upper or distal end of the ferrite rod 160 may be circumposed by a secondary or receiving coil 162 connected to a suitable receiver able to distinguish between each of the three signals so that three separate capacity readings may be displayed.

In operation a quantity of liquid with high dielectric constant, such as water W is disposed in the annular space 148. The space is then topped off with another liquid such as oil O. The shaft 164 rotates the cup 144 to a speed above critical for the system and it will be observed that the water W will, depending upon the unbalance of the system, vary in thickness about the wall of the cup. The lighter oil disposed between the water and the outer surface of the wall 142 will vary in thickness therefore. The wall 144 serves as one plate of three capacitors while the opposite plates comprise the individual plates 152. The capacity will depend on the thickness of the water layer W outward from each plate 152. The capacity affects the signal of the oscillators 154. These respective signals received by the coils 162 are filtered by means not shown and are appropriately individually registered. From the capacitances the disposition of the water layer in the cup can be derived and the extent and position of unbalance of the system of which the cup is a part may be determined.

In the FIGURE 10 embodiment the cup 180 is formed with the peripheral wall 182 and the end wall 184. The inside surface 186 of the wall 182 is stepped as shown in steps which taper, narrowing in diameter as the open mouth 188 is approached. The rim of the mouth is formed with an index mark 190. Mounted above the cup on a platform 192 is a scanning device shown schematically at 194. The device is provided with suitable lenses 196 and mirror means 198 by which it may focus out on the surface 186. Suitable lighting (not shown) is provided.

A measure of an opaque liquid is supplied into the cup 180. Then the cup and the body to be tested are rotated to above the critical speed of the system. The liquid within the cup assumes a concentric position about the free-spin axis of the cup and will rise to different levels on the surface 186 depending on the position and extent of the unbalance. Thus the liquid will, for example, rise to the step 186-a at a point X and indicate the position at which the unbalance lies. It will be clear that the level to which the liquid rises is an indication of the extent of unbalance and that if, for instance, the liquid reaches the step above 186–a the extent of unbalance is greater than if it does not.

The scanning device 194 continuously scans the steps of the surface 186 as the cup rotates. Seen instantaneously from the mirror 198 the surface 186 appears as shown in FIGURE 11, with the liquid L being in black, for instance, and the wall 182 of the cup 180 being in white. The scanning device 194 reports this information to suitable electronic equipment which may display it on the face of an oscilloscope as shown in FIGURE 12. In this figure, 190′ is the index stroke 190 seen on the top step and X′ on line 186a′ indicates the presence of liquid on the step 186–a. The figure 112 is readily translatable into the desired information, the lateral distance between 190′ and X′ on the oscilloscope indicating the distance from the index 190 on the cup at which the unbalance lies and the line on which X′ appears indicating the extent of unbalance.

The embodiment of the invention shown in FIGURES 13, 14 and 15 demonstrates its use in connection with the particle size distribution analysis system disclosed in my pending patent application Serial No. 313,365, filed October 2, 1963 and now Patent No. 3,270,563. In that application there is disclosed a rotor for determining particle size distribution of a powder sample. The rotor is represented in FIGURES 13 and 14 generally at 200 and may comprise a shallow cup-shaped container 210. The cup-shaped container is formed with a mounting sleeve 212 which is adapted to be received on to the analyzing rotor, the rotor permitting considerable flexibility and movement in lateral directions. The container is provided with a drain opening 214 and is equipped with an inner baffle structure shown in FIGURE 13. The rightward half as shown in FIGURE 13 of the baffle sturcture 216 comprises a series of semi-circular baffles of different radii arranged and supported in the rotor 200 on the container top 218. Extending radially inward from the innermost semi-circular baffle are vanes 220. On the leftward side the inner baffle structure comprises a plurality of radial vanes 222 preferably thickening in width as the periphery of the structure is approached as shown. Thus the interior of the container is divided into a plurality of equal pie-slice shapes. The entire cover is secured against the shoulder in the side wall of the container 210 by a clamping ring 224. The top is provided with a central opening 226 to facilitate filling the container. A space 228 is left between the baffles and the bottom wall of the structure.

The peripheral wall 210 is provided about its upper end with an inwardly facing pocket 230 (FIGURE 15) facing the axis of the rotor. An upper lip 232 has an index stroke 234.

In operation liquid is disposed in the pocket and the rotor is rotated on a non-rigid shaft to above critical speed. A light 236 is focused on the slanting surface 238 in the rotor. From the surface the light is directed toward the liquid held against the wall, the liquid being preferably semi-transparent. A polarizing filter 240 is provided to detect the differences between the surface of the liquid and the inner surface of the wall, for these differences indicate the thickness of the liquid layer. Preferably the light 236 is stroboscopic so that the differences between the inner surface of the liquid layer and the inner surface of the rotor wall and its relative position to the stroke 234 may be read around the bowl. The unbalance of the empty rotor is thereby determined.

Through the opening 226 the sample suspension is carefully introduced. A second reading of the unbalance is taken immediately and further readings are taken at predetermined intervals thereafter. It will be apparent that the solids on the righthand side of the container as shown in FIGURE 13 will have to settle only to the inner surface of the next outer semi-circular baffle. The solids in the lefthand side, however, have to settle all the way to the periphery of the container. Thus after the solids on the rightward side of the structure as shown in FIGURE 13 have settled against the semi-circular baffles, settling on the leftward side will continue and the center of gravity of the solids on the leftward side of the structure will move outward of the center of gravity of the solids on the rightward side of the structure. This will create an unbalance of solids toward the leftward side manifest by the movement of the free-spin axis. The unbalance will grow and finally come to equilibrium when the solids on the leftward side finally settle against the periphery of the container. Periodic reading of the unbalance may be used to develop an analysis of particle size distribution.

It will be seen that the invention as applied in FIGURES 13, 14 and 15 provides a ready means for securing accurate particle size distribution data. It should be understood that other variations are possible. For instance a non-rigid shaft may be substituted for a rigid shaft having a non-rigid mounting means.

The invention described herein provides an unusually simple and yet accurate means for measuring rotor unbalance by determining the extent and position of unbalance. Unbalance can readily be corrected for. In addition the invention provides simple means for use in connection with particle size distribution analysis.

Therefore variations are possible within the scope of the invention. Having particularly described my invention, it is to be understood that this is by way of illustration, and that changes, omissions, additions, substitutions, and/or other modifications may be made without departing from the spirit of the invention. Accordingly, it is intended that the patent shall cover, by suitable expression in the claims, the various features of patentable novelty that reside in the invention.

I claim:

1. A process for determining the condition of balance of an object with respect to a mechanical axis of rotation, the object rigidly mounting an element having an inwardly facing annular pocket disposed substantially about the mechanical axis of the object and containing a small amount of liquid, the process comprising the steps of rotating the system comprising the object and element substantially about the mechanical axis on a non-rigid suspension to above the critical speed of the system until the object assume its own free axis of rotation, the liquid mass being insignificant with respect to the mass of the object so that the liquid has insignificant effect on the condition of balance, and measuring the depth and disposition of liquid in the pocket to indicate the position of and the extent of unbalance of the object with respect to said mechanical axis.

2. A device for measuring the mass distribution in a rotating object and comprising an element having an inwardly facing annular pocket having an inwardly facing wall having a generally conical surface portion which is tapered to define a portion of a cone having an axis of symmetry and adapted to be mounted with the axis of symmetry coincident with the mechanical axis of rotation of such object, and means to measure the disposition of and depth of a liquid layer in the pocket with respect to the wall.

3. A device as described in claim 2 also including a stroboscopic light source whereby the instantaneous disposition of such liquid on the conical surface portion may be observed.

4. A device as described in claim 2 wherein the generally conical surface portion is stepped and an electronic scanning device is mounted to observe the position of the liquid on the steps, an electronic display device connected to the electronic scanning device whereby the disposition of such liquid on the steps may be displayed.

5. A device as described in claim 2 wherein electric contact means are disposed in said conical surface portion, the contact means being engaged by such liquid depending upon the thickness of the liquid layer at said contact means, electrical indicator means connected to said contact means to indicate the thickness of the liquid layer at the contact means.

References Cited by the Examiner

UNITED STATES PATENTS

| | | | |
|---|---|---|---|
| 1,876,524 | 9/1932 | Thearle | 73—470 |
| 2,525,781 | 10/1950 | Remer | 74—573 |
| 2,557,659 | 6/1951 | Ingraham | 73—467 |
| 3,028,760 | 4/1962 | Diamond | 73—516 |

FOREIGN PATENTS 562,550  10/1932  Germany.

RICHARD C. QUEISSER, *Primary Examiner.*

J. J. GILL, *Assistant Examiner.*